United States Patent
Huang

(10) Patent No.: US 7,212,707 B2
(45) Date of Patent: May 1, 2007

(54) TEMPERATURE-COMPENSATED FIBER GRATING PACKAGING ARRANGEMENT

(75) Inventor: Henry Huang, Edison, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 48 days.

(21) Appl. No.: 10/621,094

(22) Filed: Jul. 14, 2003

(65) Prior Publication Data

US 2005/0013540 A1    Jan. 20, 2005

(51) Int. Cl.
     *G02B 6/00*      (2006.01)
     *G02B 6/34*      (2006.01)

(52) U.S. Cl. .......................... 385/37; 385/136

(58) Field of Classification Search ............... 385/37, 385/136

See application file for complete search history.

(56) References Cited

U.S. PATENT DOCUMENTS

| | | | |
|---|---|---|---|
| 5,841,920 A * | 11/1998 | Lemaire et al. ............... 385/37 |
| 5,920,663 A * | 7/1999 | Dragone ....................... 385/15 |
| 6,144,789 A | 11/2000 | Engelberth et al. ........... 385/37 |
| 6,147,341 A | 11/2000 | Lemaire et al. ........ 250/227.17 |
| 6,148,128 A | 11/2000 | Jin et al. ...................... 385/37 |
| 6,243,527 B1 | 6/2001 | Dawson-Elli ............... 385/136 |
| 6,282,341 B1 | 8/2001 | Digonnet et al. ............. 385/37 |
| 6,295,399 B1 | 9/2001 | Engelberth .................... 385/37 |
| 6,356,683 B1 | 3/2002 | Hu et al. ....................... 385/37 |
| 6,360,042 B1 | 3/2002 | Long ............................ 385/37 |
| 6,396,982 B1 | 5/2002 | Lin .............................. 385/37 |
| 6,453,108 B1 | 9/2002 | Sirkis ......................... 385/136 |
| 6,498,891 B1 | 12/2002 | Wang et al. ................ 385/134 |
| 6,510,272 B1 * | 1/2003 | Wiegand .................... 385/136 |
| 6,584,248 B2 | 6/2003 | Franzen et al. ............... 385/37 |
| 6,944,374 B2 * | 9/2005 | Skull et al. .................... 385/37 |
| 2002/0003927 A1 * | 1/2002 | Tamura et al. ............... 385/37 |
| 2003/0081925 A1 * | 5/2003 | Albert ......................... 385/137 |
| 2004/0037501 A1 * | 2/2004 | Stepanov et al. ............. 385/37 |
| 2004/0042725 A1 * | 3/2004 | Stepanov et al. ............. 385/37 |

* cited by examiner

Primary Examiner—Sung Pak
Assistant Examiner—Daniel Petkovsek

(57) ABSTRACT

A passive temperature-compensated optical grating arrangement includes a housing of low CTE material, with the optical grating stretched across the housing between a first, fixed sidewall and a lever arm, the lever arm also being formed of a low CTE material. An expansion element of high CTE material is attached to the frame and disposed to contact the lever arm, resulting in rotating the lever arm as changes in temperature change the dimensions of the expansion element. By properly sizing the lever arm and the expansion element, changes in grating wavelength as a function of temperature can be compensated for by adjusting the strain applied to the grating as it is pulled or compressed as the lever arm is moved.

6 Claims, 2 Drawing Sheets

TEMPERATURE-COMPENSATED FIBER GRATING PACKAGING ARRANGEMENT

TECHNICAL FIELD

The present invention relates to a temperature-compensated fiber grating and, more particularly, to a fiber grating housed in a frame of low CTE material that includes a lever arm of low CTE material attached to the fiber grating. An expansion member of high CTE material, coupled to the lever arm, is to adjust the length of the grating so as to compensate for temperature-induced changes in the center wavelength of the grating.

BACKGROUND OF THE INVENTION

Optical gratings are important elements for selectively controlling specific wavelengths of light within optical systems. Such gratings include Bragg gratings, long period gratings and diffraction gratings and typically comprise a body of material and a plurality of substantially equally spaced optical grating elements, such as index perturbations, slits or grooves.

A typical Bragg grating comprises a length of optical waveguide, such as an optic fiber, including a plurality of index perturbations substantially equally spaced along the waveguide length. The perturbations selectively reflect light of wavelength λ equal to twice the spacing Λ between successive perturbations as multiplied by the effective refractive index, i.e., $\lambda=2n_{eff}\Lambda$, where λ is the vacuum wavelength and $n_{eff}$ is the effective refractive index of the propagating mode. The remaining wavelengths pass essentially unimpeded. Such Bragg gratings have found use in a variety of applications including, among others, filtering, adding and dropping signal channels, stabilization of lasers, reflection of fiber amplifier pump energy, and compensation for waveguide dispersion.

A long period grating typically comprises a length of optical waveguide wherein a plurality of refractive index perturbations are spaced along the waveguide by a periodic distance Λ' which is large compared to the wavelength λ of the transmitted light. Diffraction gratings typically comprise reflective surfaces containing a large number of parallel etched lines of substantially equal spacing. Light reflected from the grating at a given angle has different spectral content dependent on the spacing. The spacing in conventional diffraction gratings, and hence the spectral content, is generally fixed.

A common difficulty with all of these grating devices is temperature sensitivity. In Bragg gratings, for example, both $n_{eff}$ and Λ are temperature dependent, with the net temperature dependence for a grating in silica-based fiber being approximately +0.0115 nm/° C. for a wavelength λ=1550 nm. The temperature-induced shift in the reflection wavelength is primarily due to the change in $n_{eff}$ with temperature. While such a temperature-induced wavelength shift can be avoided by operating the grating device in a constant temperature environment, this approach requires the use of expensive and relatively bulky equipment to maintain the constant temperature.

U.S. Pat. No. 6,148,128, issued to S. Jin et al. on Nov. 14, 2000 discloses a passive temperature-compensated tunable optical fiber grating, where the grating is fixed within a stationary frame and a fiber-flexing movable body is disposed above the fiber to "flex" the fiber and induce a tensile strain so as to alter the resonant wavelength of the device. In particular, the movable body is magnetically (or mechanically) actuated to press against the fiber grating to provide a predetermined strain.

U.S. Pat. No. 6,295,399 issued to J. W. Engelberth on Sep. 25, 2001 discloses a different type of temperature compensating device for a fiber grating, using fiber and second expansion members having different coefficients of thermal expansion. The expansion members are elongated in a direction parallel to the fiber grating, with levers secured to both ends of the expansion members. Each lever has a first end flexibly secured to a respective end of the first expansion members and a middle portion flexibly secured to a respective end of the second expansion member. The other end of each lever is secured to a respective end of the fiber grating through a respective quartz block. The dimensions of the expansion members and the quartz blocks, as well as the materials of the expansion members, are selected to achieve a non-linear temperature response of the fiber grating.

While these and other devices have been useful in providing temperature compensation for fiber gratings, the devices are in general rather large in size and oftentimes cumbersome to operate. What is needed, therefore, is an arrangement for providing temperature compensation to a fiber grating that is relatively small and easy to package.

SUMMARY OF THE INVENTION

The need remaining in the prior art is addressed by the present invention, which relates to a temperature-compensation fiber grating and, more particularly, to a fiber grating housed in a frame of low CTE material that includes a lever arm of low CTE material attached to the fiber grating. An expansion member of high CTE material, coupled to the lever arm, is to adjust the length of the grating so as to compensate for temperature-induced changes in the center wavelength of the grating.

In accordance with the present invention, the particular dimensions of the low CTE lever arm and high CTE expansion member are controlled to provide the desired amount of change in the strain applied to the fiber grating to essentially null changes in wavelength attributed to temperature changes.

It is an advantage of the present invention that the combination of a low CTE lever and high CTE expansion element results in a relatively compact and robust passive arrangement that remains stable in operation.

In one embodiment, the expansion element comprises an expansion arm disposed between a frame sidewall and the lever, such that the lever's angle with respect to the frame floor will increase as the temperature increases (thus reducing strain along the fiber grating and maintaining a constant wavelength). In an alternative embodiment, the high CTE element is embedded within the frame so as to be in physical contact with the lever and create the required angular movement to provide the desired temperature compensation.

Other and further advantages and embodiments of the present invention will become apparent during the course of the following discussion and by reference to the accompanying drawings.

BRIEF DESCRIPTION OF THE DRAWINGS

Referring to the drawings, where like numerals represent parts in several views.

DETAILED DESCRIPTION

Figure 1:
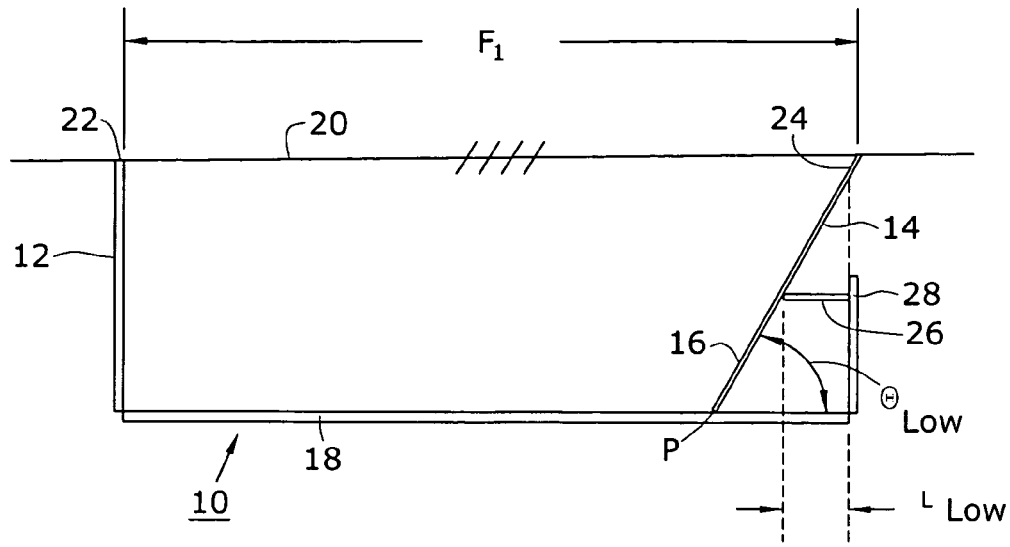
FIG. 1 illustrates, in a side view, an exemplary temperature compensated filter arrangement formed in accordance with the present invention, using an expansion arm as the high CTE element, the filter arrangement illustrated in its "low temperature" position.

The passive temperature-compensated fiber grating device of the present invention is based on the principle that the fiber grating is sensitive to changes in both temperature T and strain $\epsilon$, where an increase in temperature shifts the grating center wavelength to the longer side and a decrease in strain shifts the grating center wavelength to the shorter side. Thus, to maintain the desired center wavelength, any change in temperature can be compensated by a corresponding change in strain. In order to better understand the operation of the passive temperature compensated fiber grating of the present invention, it is useful to understand the underlying mathematical concepts associated with temperature and strain conditions. For a Bragg grating, the Bragg wavelength as a function of temperature (T) and strain ($\epsilon$) can be represented as:

$$\lambda(T,\epsilon) = 2n\Lambda$$

where n is the reflection index and $\Lambda$ is the grating period. Their partial differential results are:

$$\frac{\partial \lambda}{\partial T} = 2n \frac{\partial \Lambda}{\partial T} + 2\Lambda \frac{\partial n}{\partial T};$$

$$\frac{\partial \lambda}{\partial \epsilon} = 2n \frac{\partial \Lambda}{\partial \epsilon} + 2\Lambda \frac{\partial n}{\partial \epsilon}$$

In association with the Bragg wavelength representation, the partial differentials become:

$$\Delta \lambda_t = \frac{\lambda}{\Lambda} \frac{\partial \Lambda}{\partial T} \Delta T + \frac{\lambda}{n} \frac{\partial n}{\partial T} \Delta T$$

$$\Delta \lambda_\epsilon = \frac{\lambda}{\Lambda} \frac{\partial \Lambda}{\partial \epsilon} \Delta \epsilon + \frac{\lambda}{n} \frac{\partial n}{\partial \epsilon} \Delta \epsilon$$

The change in the Bragg wavelength with changes in both strain and temperature is then the superposition of both effects, such that the total change in Bragg wavelength can be expressed as:

$$\Delta \lambda = \Delta \lambda_t + \Delta \lambda_\epsilon = \frac{\lambda}{n} \frac{\partial \Lambda}{\partial T} \Delta T + \frac{\lambda}{n} \frac{\partial n}{\partial T} \Delta T + \frac{\lambda}{\Lambda} \frac{\partial \Lambda}{\partial \epsilon} \Delta \epsilon + \frac{\lambda}{n} \frac{\partial n}{\partial \epsilon} \Delta \epsilon.$$

The photoelastic strain constant $P_e$ is defined as follows:

$$P_e = -\frac{1}{n} \frac{\partial n}{\partial \epsilon} = 0.22,$$

and and the thermooptic coefficient $\zeta$ is defined as:

$$\zeta = \frac{1}{n} \frac{\partial n}{\partial T} = 8.31 \times 10^{-6} / {}^\circ C.$$

The fiber coefficient of thermal expansion (CTE) is defined as:

$$\alpha_f = \frac{1}{\Lambda} \frac{\partial \Lambda}{\partial T} = 0.55 \times 10^{-6} / {}^\circ C., \text{ and } \frac{1}{\Lambda} \frac{\partial \Lambda}{\partial \epsilon} = 1.$$

Substituting the above, $$\Delta \lambda = \lambda[(\alpha_f + \zeta)\Delta T + (1 - P_e)\Delta \epsilon].$$

Since in the ideal compensation case $\Delta \lambda = 0$, the above equation as be expressed as:

$$(\alpha_f + \zeta)\Delta T + (1 - P_e)\Delta \epsilon = 0.$$

As a result, the relationship of the change in strain to the change in temperature can be written as:

$$\frac{\Delta \epsilon}{\Delta T} = (\alpha_f + \zeta)/(P_e - 1) = -11.36 \times 10^{-6}$$

With this understanding, it is now possible to explain in detail the utilization of the passive temperature compensated fiber grating of the present invention. FIG. 1 illustrates an exemplary arrangement 10 of the present invention which comprises a frame 12 formed of a low coefficient of thermal expansion (CTE) material (such as, for example, Kovar or Invar). A lever 14 is fixed at a first end 16 to bottom surface 18 of frame 12 at a point P, as shown. In accordance with the present invention, lever 14 also comprises a low CTE material. A fiber grating 20 is shown as attached between a top edge surface 22 of frame 12 and the opposing end 24 of lever 14. In accordance with the present invention, an expansion arm 26 of a relatively high CTE material (such as, for example, brass or an aluminum alloy) is positioned between sidewall 28 of frame 12 and lever 14. Thus, as the ambient temperature changes, expansion arm 26 will expand or contract, changing the angle of lever 14 vis-à-vis frame 12, and therefore imparting a stress or strain on fiber grating 20 as it is similarly stretched or compressed. Indeed, the higher the temperature, the greater the tuning angle $\theta$ of lever 14. Therefore, by careful choice of the materials, length of expansion arm, etc., it is possible to impart a strain change in the fiber grating that compensates for the changes in ambient temperature. That is, the lever angular movement is chosen, in accordance with the present invention, to generate a corresponding linear displacement of the fiber grating so as to compensate for the wavelength shift associated with temperature changes. The key to the arrangement of the present invention is the use of the high CTE expansion element 26 in association with the displacement of the low CTE lever 14 to provide a strain change that compensates for the temperature-induced wavelength shift, such that the strain change can be expressed as a displacement.

Figure 2:
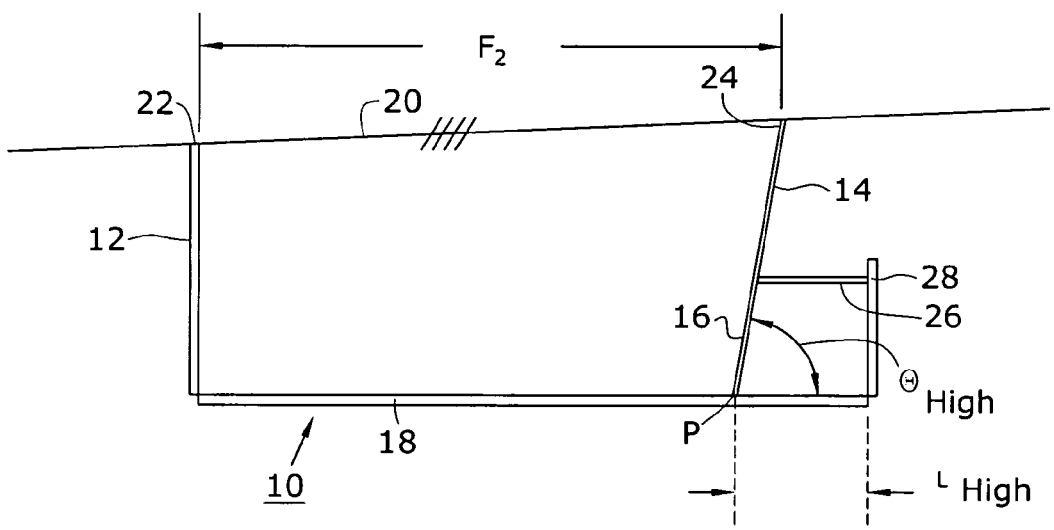
FIG. 2 is a simplified version of the filter of FIG. 1, showing the position of the filter for the "high temperature" position.

FIG. 1 illustrates compensation device 10 of the present invention in the case where the ambient temperature is relatively low, and expansion arm 26 is relatively short and defined as comprising a first length $l_{low}$. In this arrangement, therefore, the angular displacement of lever arm 14 is relatively large, and a strain is induced on grating 20 such that grating 20 exhibits a length $F_1$. This arrangement is to be compared with the embodiment of FIG. 2, which also illustrates compensation device 10, in this case where the temperature has increased and expansion arm 26 has lengthened to exhibit a length $l_{high}$, as shown. The expansion of arm 26 results in a rotation of lever arm 14 through an angle $\theta_{high}$ so as to decrease the strain on fiber grating 20, and shorten grating 20 to exhibit a length $F_2$. For the sake of comparison, FIG. 3 illustrates the position of lever 14 in both the "low temperature" (FIG. 1) and "high temperature" (FIG. 2) positions, as controlled by the expansion/contraction of expansion arm 26 and resultant movement of lever 14.

Figure 3:
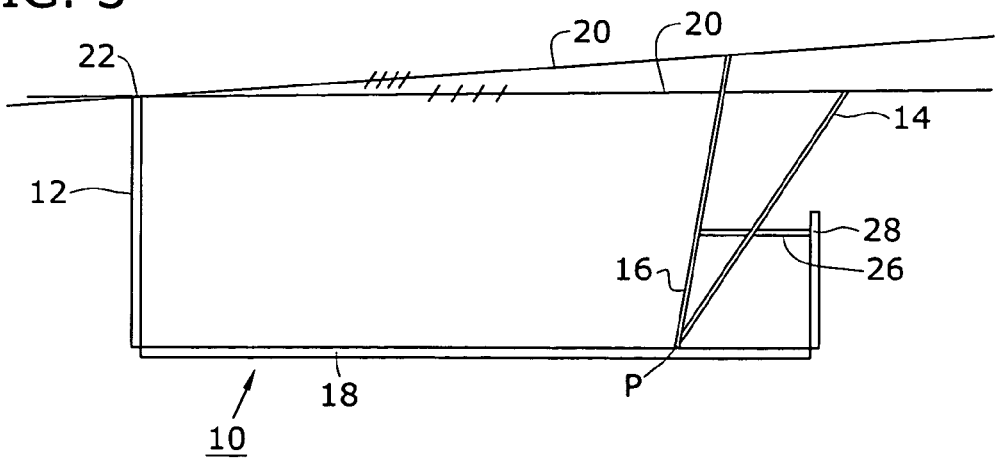
FIG. 3 illustrates, for the sake of comparison, both the exemplary "low temperature" filter position of FIG. 1 and the "high temperature" filter position of FIG. 2.

Referring to FIG. 3, an increase in temperature causes expansion arm 26 to lengthen and the angular displacement of lever 14 to increase the pivot angle from $\theta_{low\ T}$ to $\theta_{high\ T}$. The displacement of lever 14 can be expressed as follows:

$$\Delta L = L_{Low\ T} - L_{high\ T}, \text{ where}$$

$$L_{low\ T} = L \cos \theta_{low\ T} \text{ and } L_{high\ T} = L \cos \theta_{high\ T}, \text{ so}$$

$$\Delta L = L(\cos \theta_{low\ T} - \cos \theta_{high\ T}).$$

From the above discussion, the displacement can be expressed as:

$$\frac{\Delta \lambda \varepsilon}{\lambda} = (1 - P_e)\Delta \varepsilon = (1 - P_e)\frac{\Delta L}{L},$$

where L is defined as the length of lever 14, and by simplifying:

$$\Delta \varepsilon = \frac{\Delta L}{L}.$$

In a specific example, a 15 mm long fiber (10 mm grating, plus 2.5 mm buffer for each end) with a center wavelength at 1550 nm, the wavelength change in 100° C. is 1.1 nm. To compensate for this wavelength shift using the passive arrangement of the present invention, the required strain would be defined as:

$$\Delta \varepsilon = \frac{1}{1 - P_e}\frac{\Delta \lambda \varepsilon}{\lambda} = \frac{\Delta L}{L}.$$

The corresponding displacement is:

$$\Delta L = \frac{L}{1 - P_e}\frac{\Delta \lambda \varepsilon}{\lambda} = 13.6476 \ \mu m$$

Thus, set the lever length L to 5 mm, lever initial angle $\theta_{low\ T}$ to 90°, and expansion arm 26 to 1.25 mm. It can be shown that the high CTE expansion arm 26 needs to expand a maximum of 3.412 μm to provide a displacement of ΔL of 13.6476 μm to provide for passive temperature compensation.

Figure 4:
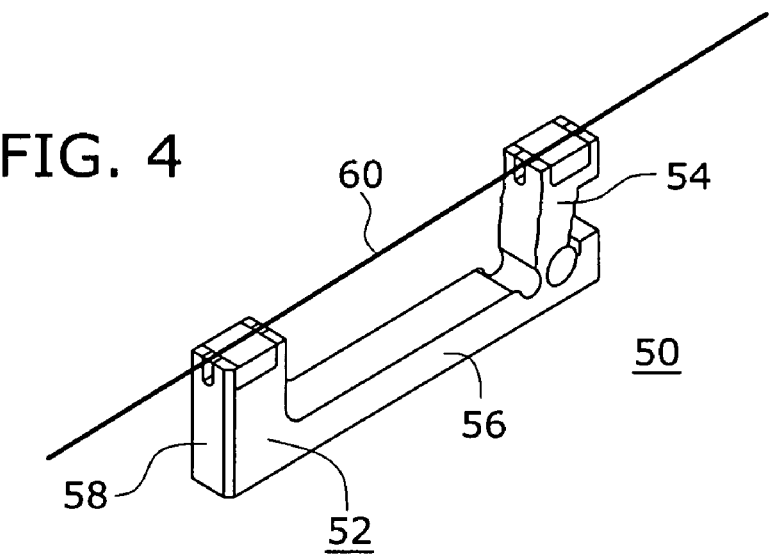
FIG. 4 is an isometric view of an alternative embodiment of the present invention, using an expansion disc of high CTE material to adjust the position of the low CTE lever arm.

FIG. 4 illustrates an alternative passive temperature-compensated fiber optic grating structure 50. As with the arrangement discussed above, structure 50 comprises a frame 52 formed of a low CTE material. A lever 54 is also formed of a low CTE material and is fixed to frame 52 along a floor portion 56. A fixed sidewall 58 of frame 52 is also formed of a low CTE material. As shown, a fiber grating 60 is attached between fixed sidewall 58 and lever 54.

Figure 5:
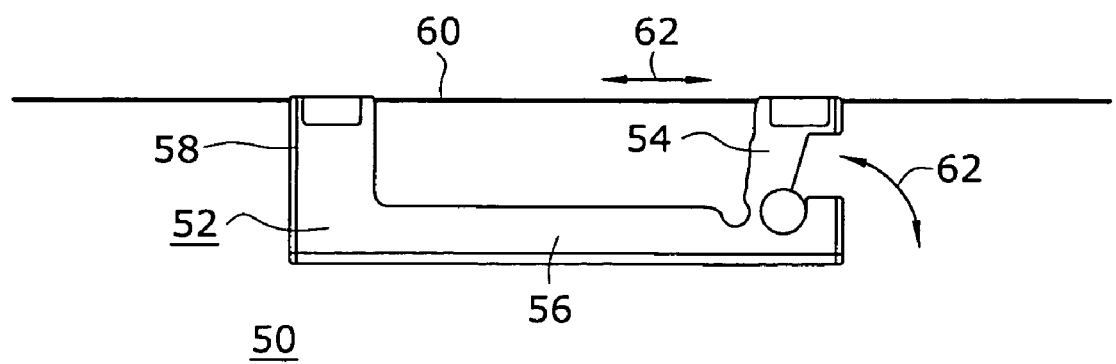
FIG. 5 is a side view of the alternative embodiment of FIG. 4, clearly illustrating the placement of the high CTE expansion disc with respect to the lever.

In this particular embodiment of the present invention, an expansion disc 62 of a high CTE material is disposed within frame 52 so as to be in intimate physical contact with lever 54, preferably near the area where lever 54 is attached to floor portion 56. As shown clearly in the side view of FIG. 5, as expansion disc 62 expands/contracts during temperature changes, lever 54 will likewise move. The arrow in FIG. 5 illustrates this movement of lever 54 in response to changing dimensions of disc 62. Thus, in accordance with the present invention, the size of disc 62 can be chosen to provide the proper change in strain along fiber grating 60 to compensation for changes in temperature.

What is claimed is:

1. A passively temperature-compensated optical grating device comprising:
   a support frame formed of a material exhibiting a relatively low coefficient of thermal expansion (CTE), said support frame including a floor bottom surface, a first fixed sidewall and a second fixed sidewall;
   a lever arm formed of a relatively low coefficient of thermal expansions (CTE) material fixed at a first end to a predetermined pivot point along the support frame bottom surface, a second, remaining end of said lever arm free to rotate about said pivot point;
   an optical fiber grating attached between said first fixed sidewall and said second, remaining end of said lever arm; and
   an expansion element formed of a material exhibiting a relatively high coefficient of thermal expansion (CTE), said expansion element coupled between the second, fixed sidewall and said lever arm, wherein changes in the dimensions of said high CTE expansion element as a function of temperature rotate said lever arm through a predetermined angle about said pivot point to modify the strain applied to said optical fiber grating and change the wavelength of said optical grating device.

2. The passively temperature-compensated optical grating device of claim 1 wherein the low CTE support frame and lever arm comprise Kovar.

3. The passively temperature-compensated optical grating device of claim 1 wherein the low CTE support frame and lever arm comprise Invar.

4. The passively temperature-compensated optical grating device of claim 1 wherein the high CTE expansion element comprises an aluminum alloy.

5. The passively temperature-compensated optical grating device of claim 1 wherein the high CTE expansion element comprises brass.

6. The passively temperature-compensated optical grating device of claim 1 wherein the high CTE expansion element comprises an expansion arm disposed between the second, fixed sidewall and the lever arm.

* * * * *